(12) United States Patent
Monti et al.

(10) Patent No.: US 6,269,836 B1
(45) Date of Patent: Aug. 7, 2001

(54) BREAKAWAY ANTI POLLUTION SAFETY VALVE IN A FLUID DUCT

(75) Inventors: Corrado Monti; Andrea Abbá, both of Borgomanero (IT)

(73) Assignee: Mecaer Meccanica Aeronautics S.R.L., Borgomanero (IT)

( * ) Notice: Subject to any disclaimer, the term of this patent is extended or adjusted under 35 U.S.C. 154(b) by 0 days.

(21) Appl. No.: 09/582,270
(22) PCT Filed: Dec. 1, 1998
(86) PCT No.: PCT/EP98/07787
§ 371 Date: Jun. 23, 2000
§ 102(e) Date: Jun. 23, 2000
(87) PCT Pub. No.: WO99/34144
PCT Pub. Date: Jul. 8, 1999

(30) Foreign Application Priority Data

Dec. 23, 1997 (IT) .............................................. MI97A2851

(51) Int. Cl.[7] .................................................. F16K 29/00
(52) U.S. Cl. ............................................ 137/614.02; 285/1
(58) Field of Search .............................. 137/614, 614.01, 137/614.02, 614.03, 614.04, 68.14; 285/1; 251/305

(56) References Cited

U.S. PATENT DOCUMENTS

| | | | |
|---|---|---|---|
| 3,152,815 | * 10/1964 | Barragato et al. | 285/1 |
| 3,435,848 | * 4/1969 | Johnston | 137/614.04 |
| 4,667,883 | * 5/1987 | Fink, Jr. | 137/614.02 X |
| 5,305,776 | * 4/1994 | Romano | 137/614.02 X |
| 5,351,708 | * 10/1994 | Donato et al. | 137/614.02 X |
| 5,564,471 | 10/1996 | Wilder et al. . | |
| 5,695,221 | * 12/1997 | Sunderhaus | 285/1 |

FOREIGN PATENT DOCUMENTS

| | | |
|---|---|---|
| 0764809A1 | 3/1997 | (EP) . |
| 2450403 | 9/1980 | (FR) . |

* cited by examiner

*Primary Examiner*—Kevin Lee
(74) *Attorney, Agent, or Firm*—Young & Thompson

(57) ABSTRACT

Two flanged cylinders, one of which slides inside the other, are kept selectively in firm contact with each other by the engagement of elastic elements and their terminal booths with grips. The elastic elements and grips are fixed, respectively, on the outer perimeter of the inner cylinder and the outer perimeter of the outer cylinder. Engagement is maintained until the traction force applied to the two cylinders exceeds a predetermined value.

6 Claims, 2 Drawing Sheets

BREAKAWAY ANTI POLLUTION SAFETY VALVE IN A FLUID DUCT

FIELD OF THE INVENTION

The present invention concerns a breakaway anti pollution safety valve in a fluid duct.

The field of the invention is that of safety valves capable of coming into action prior to the breakage of marine ducts—be they submerged or on the surface—carrying a fluid and liable to become subjected to the action of abnormal traction forces, especially a duct carrying oil extracted from an underwater source and pumped into a buoy or an oil tanker.

BACKGROUND OF THE INVENTION

Prior art valves suitable for this purpose consist of two cylindrical parts, each of which is provided with. two butterflies on its inside that in normal conditions are closed since they are kept in position by appropriate means of engagement and, when they become detached from these means, open under the action of springs to interrupt the oil flow in the duct. It should be clarified that the term "butterflies closed" is hereinafter to be understood as referring to the position in which they are held when the duct is open and operating, while "butterflies open" refers to the position they assume after being released to close the duct. Both the cylindrical parts are provided with circular flanges along the entire outer perimeter of the cylinder, so that they can be fixed to each other by means of appropriate bolts. In normal operating conditions these bolts maintain the valve assembled and the separation of the two parts of the valve following a breakaway occurs as a result of the failure of the said bolts, which are designed and calibrated to fail at a given traction force. Indeed, the separation of the two parts of the valve must necessarily occur before the duct actually breaks. The best known valves of this prior art type are manufactured by the Atema, Gail Thomson and MIB companies.

Document US A-5 564 471 is known that discloses a fuel hose breakaway unit in which fixed abutment lugs are formed on one of the couplers and are shaped to engage force fingers carried by the other coupler; moveable lugs having ramped abutment surfaces are located on the fingers and engage ramped surfaces on the fixed abutment lugs to lock the couplers together; a sleeve is adjustably mounted on the force fingers to maintain the engagement of the couplers. In the assembled position, the sleeve prevents separation of the force fingers and fixed lugs. A spring unit is disposed adjacent to the sleeve and is calibrated so that when a separation force is applied to the unit, the spring compresses and if the separation force exceeds a predetermined value the spring pushes the sleeve away from the force fingers, allowing the fingers to flex outwardly away from the lugs to decouple the unit. The spring unit also absorbs line shock forces applied to the breakaway unit in order to limit the effects of these forces on the remaining components in the unit.

The principal drawback of the prior art valves referred to in the first list here above is that the fixing system of the two parts of the valve requires all the fixing elements to be substituted following a breakage of the duct, while a second drawback is constituted by the fact that the calibrated bolts may not all fail at the same time when the valve is subjected to bending in addition to tension; in that case the two parts of the valve would separate on one side and remain in contact on the other. Such a partial misalignment would not cause the butterflies to become released, so that oil would gush from the duct. A further drawback deriving from this fixing system is the considerable weight and size of valves of this type.

The drawbacks are considered with reference to the fact that the valve disclosed in US A-5 564 471 is adapted for mounting in a fuel hose between a fuel dispenser and nozel; on the contrary, the valve of the present invention is particularly adapted for use in submarine conditions wherein ducts have dimensions that are multiple of those in a fuel hose. The valve disclosed in US A-5 564 471 presents a mechanical complication involving a number of finely worked pieces; the use of a spring unit which should be sturdy enough to face its duty and would result of heavy weight and cost. As a whole, this valve does not appear adapted to work in said submarine conditions which would likely entail malfunctioning of the parts due to wearing and corrosion.

SUMMARY OF THE INVENTION

The present invention obviates these drawbacks and comprises two flanged cylinders, one of which slides inside the other, the cylinders being kept selectively in firm contact with each other by the engagement of the terminal tooth in a plurality of elastic elements with a plurality of grips, the elastic elements being peripherically distanced around and longitudinally extending from the outer perimeter of the inner cylinder and the grips being peripherally fixed on the perimeter of the outer cylinder, characterized in that the elastic elements have a calibrated radial elasticity so that the engagement is maintained until the traction force applied to the two cylinders through two opposite parts of the duct exceeds a predetermined value which causes the elastic elements to bend outwardly.

In the course of this description the flanged cylinders will be called more simply outer cylinder and inner cylinder, while the elastic elements ending by tooths will be referred to as tooths. In particularly, an external casing associated with the upper surface of the flange of the cylinders encloses the said tooths and grips, the enclosure being made watertight by means of appropriate gaskets. The engagement of the tooths with the grips is precalibrated in order to fail before a possible duct breakage. Each of the cylinders is conventionally provided on its inside with two butterflies kept closed by a suitable engagement, this too arranged on the inside of the cylinder. Upon the detachment of the two cylinders, these butterflies become released from the said suitable engagements to close the duct and interrupt the oil flow, each butterfly moving under the action of two torsion springs.

Lastly, the fixing of this valve to the duct is made by associating the flange of each cylinder with a connection flange forming part of the duct end to be joined by the valve.

The principal advantage of the valve according to the invention over prior art valves consists of the fact that it can be completely reassembled after a duct failure and does not call for any repairs or replacements; a second advantage consists of the fact that, even when the valve is loaded in both tension and bending, the two parts of the valve will always completely separate along the longitudinal axis; yet another advantage is provided by the fact that the said engagement permits the valve to be smaller than its prior art counterparts and to present less mechanical complication and a minimized number of parts with respect to known valves.

BRIEF DESCRIPTION OF THE DRAWINGS

The present invention will now be described in greater detail by means of an embodiment example illustrated with the help of the attached diagrammatic drawings wherein.

DETAILED DESCRIPTION OF PREFERRED EMBODIMENTS

Figure 1:
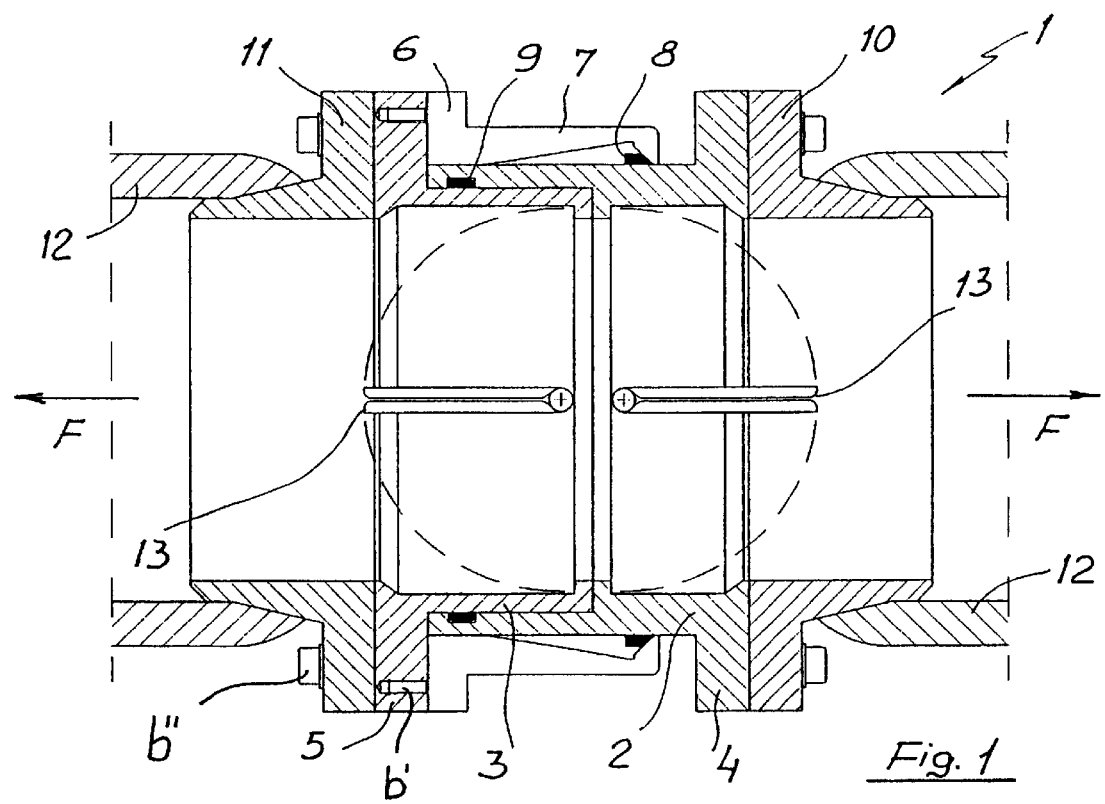
FIGS. 1 to 4 are longitudinal sections through the valve.

FIGS. 1, 2, 3 and 4 show one and the same valve 1 in successive phases of the separation of the two cylinders when the latter come under the action of a traction force exceeding a predetermined value through a pipe line carrying oil (though the oil flow is not shown on the drawings). Identical numbers in these figures always refer to identical parts. In particular, these figures show a valve 1 consisting of an outer cylinder 2 that slides on an inner cylinder 3, the said two cylinders being provided, respectively, with the flanges 4 and 5. A ring 6 is fixed to the flange 5 by means of the bolts b' carries, arranged at a suitable distance from each other, the elastic elements 7, each of which is provided with a terminal tooth that enables them to engage with a grip consisting of a calibrated ring 8 and thus keep the cylinders 2 and 3 in firm contact with each other up to a predetermined traction force, the calibrated ring 8 being attached to the outer perimeter of the outer cylinder 2. A gasket 9 arranged between the two sliding surfaces of the cylinders prevents the leakage of oil. The flanges 4 and 5 are each fixed by means of bolts b' to the respective connection flanges 10, 11 which in their turn are fastened to the two parts of the pipeline 12. When the traction force applied to the two cylinders through the pipeline 12, as indicated by the arrows F, exceeds a predetermined value, the elastic elements 7 will deform in a radial movement in respect to the longitudinal axis of the valve and becomes disengaged from the calibrated ring 8, thus permitting the cylinders 2 and 3 to come apart and avoid breakage of the pipe elsewhere. The exact geometry of the contact surfaces of the elastic elements 7 and the calibrated ring 8, together with the elasticity of the elastic elements, constitute the calibration of the resistance that the valve can oppose to a predetermined traction force.

Furthermore, it can be seen from FIG. 1 that inside each cylinder there are two butterflies 13 that are kept closed by an appropriate engagement not shown in the figure. The details of the functioning of these butterflies will not be described here, since the arrangement is well known from the prior art.

Figure 2:
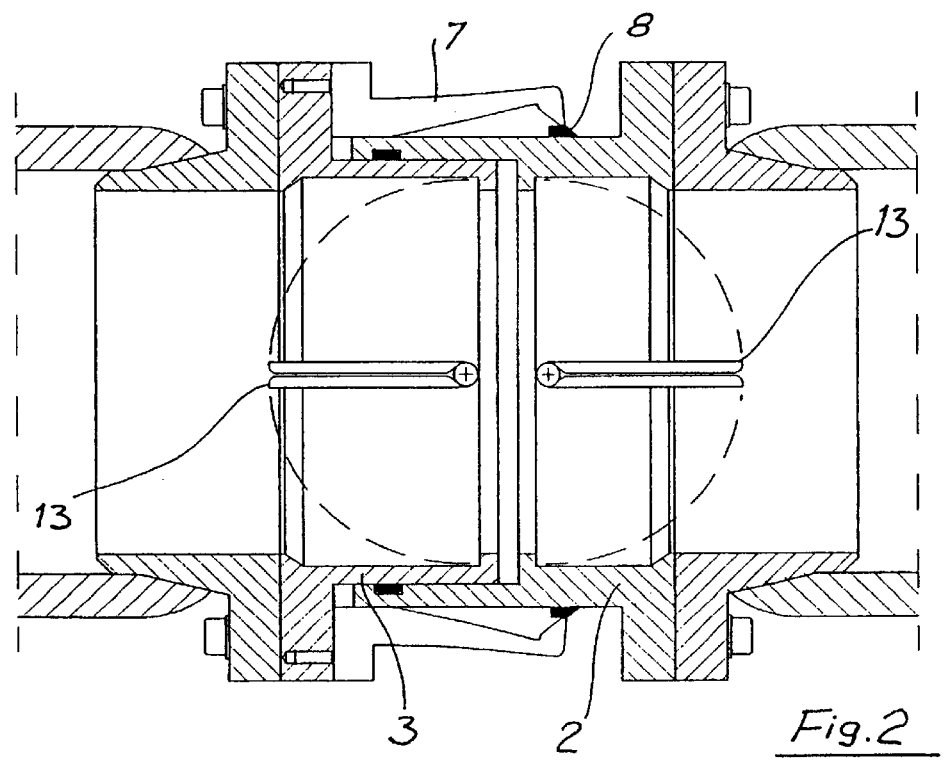

FIG. 2, in particular, shows that the initial separation of the two cylinders 2 and 3 causes the disengagement of the elastic elements 7 from the calibrated ring 8. In this phase the two butterflies are still closed.

Figure 3:
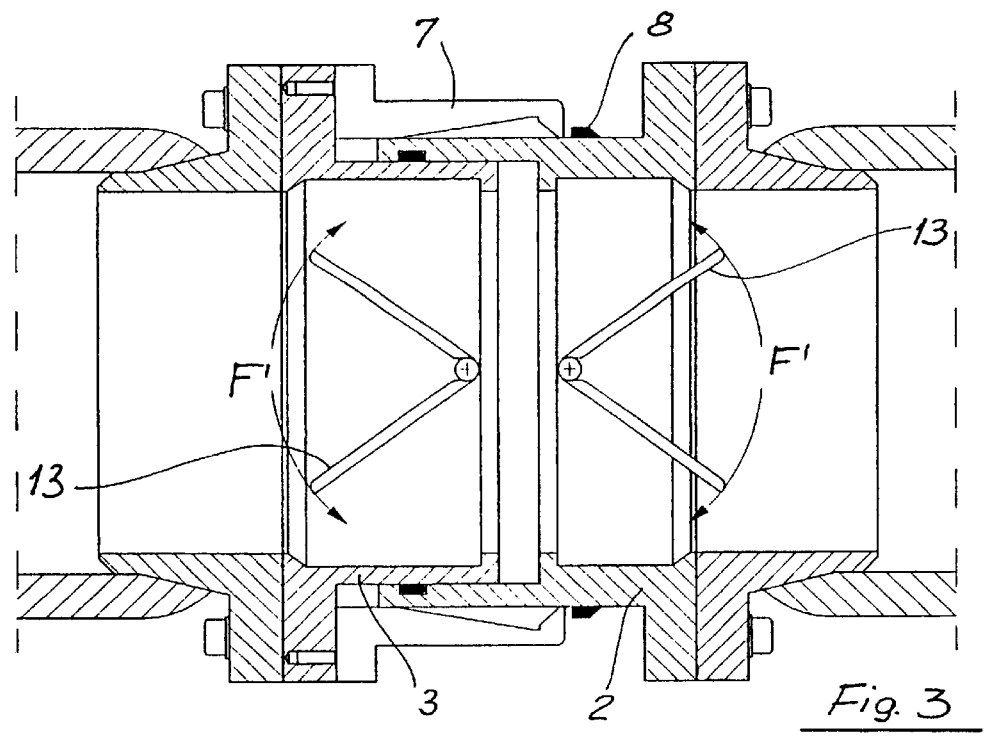

FIG. 3, on the other hand, shows that the butterflies 13, little by little as the two cylinders move away from each other, disengage from the means that keeps them closed and begin to open in the direction of the arrows F' under the action of two torsion springs, though neither the means of engagement nor the torsion springs are shown in the figure. The figure also shows that at this stage the elastic elements 7 have become completely disengaged from the calibrated ring 8.

Figure 4:
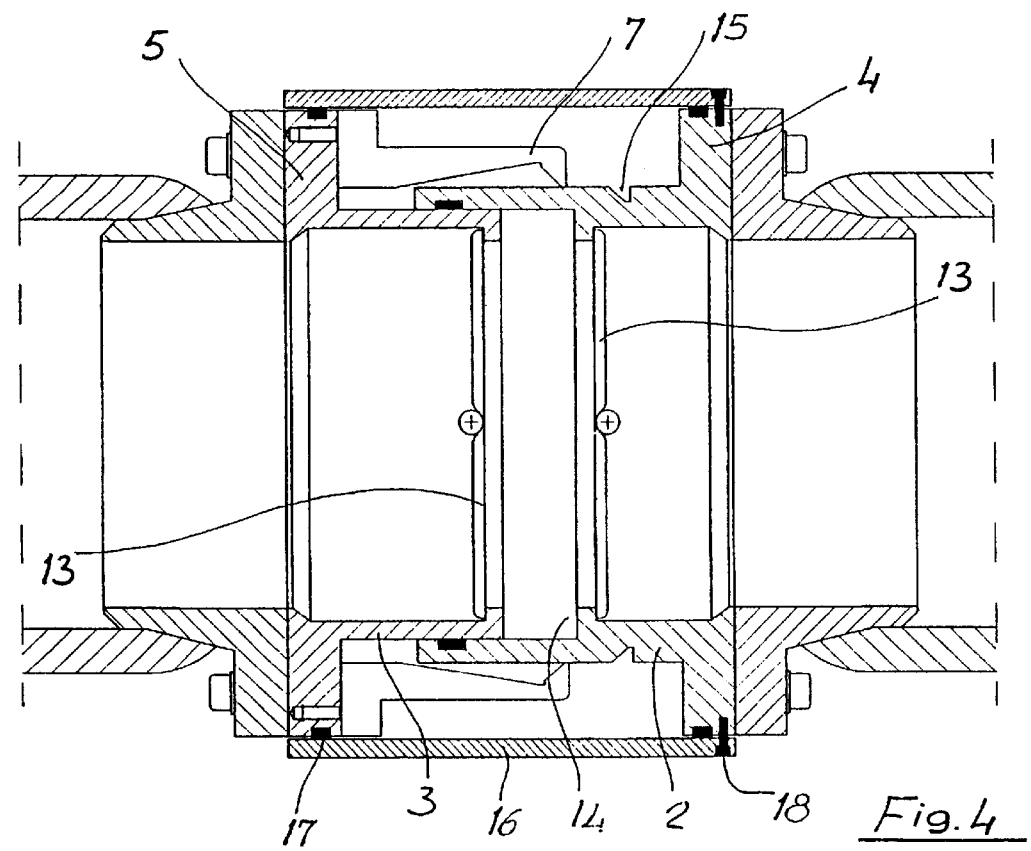

FIG. 4 shows the phase in which the butterflies 13 are completely open. In this phase one notes that the pipe becomes completely closed, thus blocking the oil flow. The figure further shows that inside the cylinders 2 and 3, as already happens in the case of some known valves, there forms a chamber 14 to limit the loss of oil. In fact, the largest quantity of oil that can become spilt after the two cylinders come apart is the volume contained in this chamber. Unlike the previous figures, FIG. 4 shows that the engagement of the elastic elements is assured by a groove 15 in the outer surface of the cylinder 2. This figure also shows the casing 16 that encloses the elastic elements and the engagement by means of gaskets 17 that render it watertight. The casing is fixed to the upper surface of the flange 4 by screws 18 and is only in rest on the upper surface of flange 5 in such a way as not to cause any interference when the cylinders 2 and 3 move away from each other.

What is claimed is:

1. A breakaway anti pollution safety valve in a fluid duct, the valve comprising two flanged cylinders, one of which slides inside the other, said cylinders being kept selectively in firm contact with each other by the engagement of a terminal tooth in a plurality of elastic elements with a plurality of grips, said elastic elements being peripherally distanced around and longitudinally extending from the outer perimeter of the inner cylinder and said grips being peripherally fixed on the outer perimeter of the outer cylinder, wherein said elastic elements have a calibrated radial elasticity so that the engagement is maintained until a traction force applied to the two cylinders exceeds a predetermined value which causes said elastic elements to bend outwardly.

2. The breakaway anti pollution safety valve in accordance with claim 1, wherein said plurality of elastic elements is integral with a ring fixed on the outer perimeter of the inner cylinder and said plurality of grips is an annular projection fixed to the outer cylinder.

3. The breakaway anti pollution safety valve in accordance with claim 1, wherein said plurality of grips consists of an annular groove on the outer surface of said outer cylinder.

4. The breakaway anti pollution safety valve in accordance with claim 1, further comprising a casing associated with the outer surfaces of said cylinders encloses said plurality of elastic elements and grips in a water-tight manner.

5. A breakaway anti pollution safety valve comprising:

opposed connection flanges, each of the connection flanges having a duct receiving surface;

first and second flanged cylinders, each of the flanged cylinders connected to one of the connection flanges opposite the duct receiving surface, one of the flanged cylinders sliding inside the other flanged cylinder;

a plurality of elastic elements attached to the flange of the inner cylinder and spaced from the outer perimeter of the inner cylinder, the elastic elements having a terminal tooth;

an annular projection fixed on the outer perimeter of the outer cylinder;

a gasket arranged between the inner perimeter of the outer cylinder and the outer perimeter of the inner cylinder; and a closable valve member mounted within each of the flanged cylinders;

wherein the outer cylinder and the inner cylinder are kept in firm contact with each other by the outer cylinder being positioned between the outer perimeter of the inner cylinder and the elastic elements and the terminal tooth of the elastic elements engaging the annular projection on the outer perimeter of the outer cylinder.

6. A breakaway anti pollution safety valve comprising:

opposed connection flanges, each of the connection flanges having a duct receiving surface;

first and second flanged cylinders, each of the flanged cylinders connected to one of the connection flanges opposite the duct receiving surface, one of the flanged cylinders sliding inside the other flanged cylinder;

a plurality of elastic elements attached to the flange of the inner cylinder and spaced from the outer perimeter of the inner cylinder, the elastic elements having a terminal tooth;

an annular groove on the outer perimeter of the outer cylinder;

a gasket arranged between the inner perimeter of the outer cylinder and the outer perimeter of the inner cylinder; and a closable valve member mounted within each of the flanged cylinders;

wherein the outer cylinder and the inner cylinder are kept in firm contact with each other by the outer cylinder being positioned between the outer perimeter of the inner cylinder and the elastic elements and the terminal tooth of the elastic elements engaging the annular groove on the outer perimeter of the outer cylinder.

* * * * *